(12) United States Patent
Ikeda

(10) Patent No.: US 8,203,690 B2
(45) Date of Patent: Jun. 19, 2012

(54) LIQUID CRYSTAL DISPLAY DEVICE AND METHOD OF MANUFACTURING SAME

(75) Inventor: Masaki Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 200 days.

(21) Appl. No.: 12/670,636

(22) PCT Filed: May 1, 2008

(86) PCT No.: PCT/JP2008/058348
§ 371 (c)(1), (2), (4) Date: Jan. 25, 2010

(87) PCT Pub. No.: WO2009/019913
PCT Pub. Date: Feb. 12, 2009

(65) Prior Publication Data
US 2010/0201913 A1 Aug. 12, 2010

(30) Foreign Application Priority Data
Aug. 9, 2007 (JP) .................................. 2007-208068

(51) Int. Cl.
*G02F 1/13* (2006.01)
*G02F 1/1333* (2006.01)
*G02F 1/1335* (2006.01)
(52) U.S. Cl. ......... 349/192; 349/158; 349/159; 349/112
(58) Field of Classification Search ................. 349/192, 349/158, 159, 112
See application file for complete search history.

(56) References Cited

U.S. PATENT DOCUMENTS

| | | | |
|---|---|---|---|
| 6,693,699 B2 * | 2/2004 | Inoue et al. | 349/158 |
| 2004/0179028 A1 | 9/2004 | Arai | |
| 2006/0092372 A1 * | 5/2006 | Kim et al. | 349/192 |
| 2007/0035678 A1 | 2/2007 | Yoo et al. | |
| 2007/0046863 A1 * | 3/2007 | Miyao et al. | 349/95 |
| 2007/0126945 A1 | 6/2007 | Tashiro | |
| 2010/0053491 A1 | 3/2010 | Ikeda et al. | |
| 2010/0134717 A1 | 6/2010 | Ikeda et al. | |

FOREIGN PATENT DOCUMENTS

| | | |
|---|---|---|
| JP | 4-301616 A | 10/1992 |
| JP | 4-301672 A | 10/1992 |
| JP | 5-127152 A | 5/1993 |
| JP | 6-313881 A | 11/1994 |

(Continued)

*Primary Examiner* — Wen-Ying P Chen
(74) *Attorney, Agent, or Firm* — Birch, Stewart, Kolasch & Birch, LLP

(57) ABSTRACT

A liquid crystal display device 10 of the present invention includes a liquid crystal panel 11 and a lighting device 12. The liquid crystal panel 11 has a liquid crystal layer 50 between a pair of glass substrates 31 and 41. The lighting device 12 provides illumination light to the liquid crystal panel 11. A concave lens 60 is formed on the glass substrate 41 among the pair of glass substrates 31 and 41, which is arranged on a side opposite from the lighting device 12. The concave lens 60 has a recess on a surface of glass substrate 41 on an opposite side from the liquid crystal layer 50 in an area overlapping a black dot failure occurrence area when viewed in plan. A light transmissive material 70 having a refraction index equal to or higher than the glass substrate 41 is applied to at least a part of the concave lens 60.

10 Claims, 14 Drawing Sheets

FOREIGN PATENT DOCUMENTS

| | | |
|---|---|---|
| JP | 7-5453 A | 1/1995 |
| JP | 2004-070073 A | 3/2004 |
| JP | 2004-279464 A | 10/2004 |
| JP | 2004-359475 A | 12/2004 |
| JP | 2005-189360 A | 7/2005 |
| JP | 2005-345602 A | 12/2005 |
| WO | WO-01/86616 A1 | 11/2001 |
| WO | WO 2008/081616 A1 | 7/2008 |
| WO | WO 2008/096472 A1 | 8/2008 |

* cited by examiner

LIQUID CRYSTAL DISPLAY DEVICE AND METHOD OF MANUFACTURING SAME

TECHNICAL FIELD

The present invention relates to a liquid crystal display device and a method of manufacturing the liquid crystal display device.

BACKGROUND ART

The following is an example of method of manufacturing a liquid crystal display device. Switching elements (e.g., TFT) and pixel electrodes are arranged on one of glass substrates provided in a pair, and counter electrodes are arranged on the other glass substrate. Those glass substrates are then bonded with spacers between them. Liquid crystal is disposed between the glass substrates so as to form a liquid crystal layer. Then, polarizing plates are attached to respective surfaces of the glass substrates to produce a liquid crystal panel. A lighting device that has a plurality of cold cathode tubes as light source is mounted to the liquid crystal panel.

In such a production process of liquid crystal display device, a display defect detection may be performed after a liquid crystal layer is formed, for example. In such an inspection process, if a foreign substance is present in the liquid crystal layer, light that strikes it is irregularly reflected and may create bright dots on black display. These dots would be detected as luminance point defects. The luminance point defects are very noticeable. Therefore, they greatly degrade the display quality and yield in production.

Patent Document 1 discloses an example of method of compensating for such a luminance point. If a luminance point defect is present in a pixel element, a processed concave portion is formed near a surface of transparent substrate on an incidence side of a travel path of light that illuminates the pixel element. The concave portion has a rough bottom surface for light scattering.

According to the invention of Patent Document 1, illumination light is scattered by the processed concave portion, which is formed on the transparent substrate on an incidence side, and therefore the luminance point picture element is not noticeable with respect to normal picture elements in the surrounding area.

Furthermore, as a method of compensating for a luminance point defect by making it invisible, means for compensating for a luminance point defect by blackening that makes a luminance point defect occurrence area black for normally black display is used (e.g., Patent Document 2). A black dot on the display surface created by blackening is less noticeable compared to the luminance point and therefore it does not lead to significant degradation of display quality. Thus, yield in production can be improved.

Patent Document 1: JP-A-06-313881
Patent Document 2: JP-A-2005-189360

DISCLOSURE OF THE PRESENT INVENTION

Problem to be Solved by the Invention

Although the black dot created by blackening is less noticeable compared to the luminance point, it is still a display defect that is always displayed in black.

Moreover, if the foreign substance in the liquid crystal layer lies from the pixel electrode on one of the glass substrate to the counter electrode on the other glass substrate, a leak occurs between the pixel electrode and the counter electrode. This may create a black dot defect.

In such a case, black dots, black dot defect and the like (referred to as black dot failures collectively) could degrade the display quality and yield in production if they are large enough in size to be noticeable or present in large quantity.

The present invention was made in view of the foregoing circumstances, and an object thereof is to make a black dot failure less noticeable and provide a liquid crystal display device having high display quality. Another object of the present invention is to provide a method of manufacturing a liquid crystal display device including a process of properly compensating for a black dot failure that is present in the liquid crystal display device.

Means for Solving the Problem

To solve the above-described problem, a liquid crystal display device of the present invention has the following feature. The liquid crystal display device includes a liquid crystal panel having a liquid crystal layer between a pair of glass substrates, and a lighting device that provides illumination light to the liquid crystal panel. A concave lens is formed on at least one of the glass substrates located on an opposite side from the lighting device. The concave lens has a recess on a surface of the glass substrate located on an opposite side from the liquid crystal layer in an area that overlaps a black dot failure occurrence area when viewed in plan. The concave lens has a light transmissive material applied to at least a part thereof. The light transmissive material has a refraction index equal to or higher than the glass substrate.

As described above, the concave lens having a recess on an opposite side from the liquid crystal layer (i.e., on a display surface side) is formed on the glass substrate located on the opposite side from the lighting device. Therefore, light beams that have entered the concave lens after passing through the liquid crystal layer are collected and then emitted to the display surface side. According to the present invention, the concave lens is formed in an area that overlaps a black dot failure occurrence area when viewed in plan. Thus, the black dot failure converges to its center and looks microscopic. As a result, the black dot failure is less noticeable on the display surface and therefore the liquid crystal display device having high display quality is provided.

Furthermore, the concave lens has a light transmissive material having a refraction index equal to or higher than the glass substrate applied to at least a part thereof.

By applying such a light transmissive material, scattering of light caused by surface roughness of the concave lens can be suppressed. Moreover, applying a material having a high refraction index makes the refraction index of the concave lens higher. As a result, light collection capability of the concave lens becomes even higher and therefore the black dot failure on the display surface is less noticeable.

BEST MODE FOR CARRYING OUT THE INVENTION

An embodiment of the present invention will be explained with reference to FIGS. 1 to 10.

Figure 1:
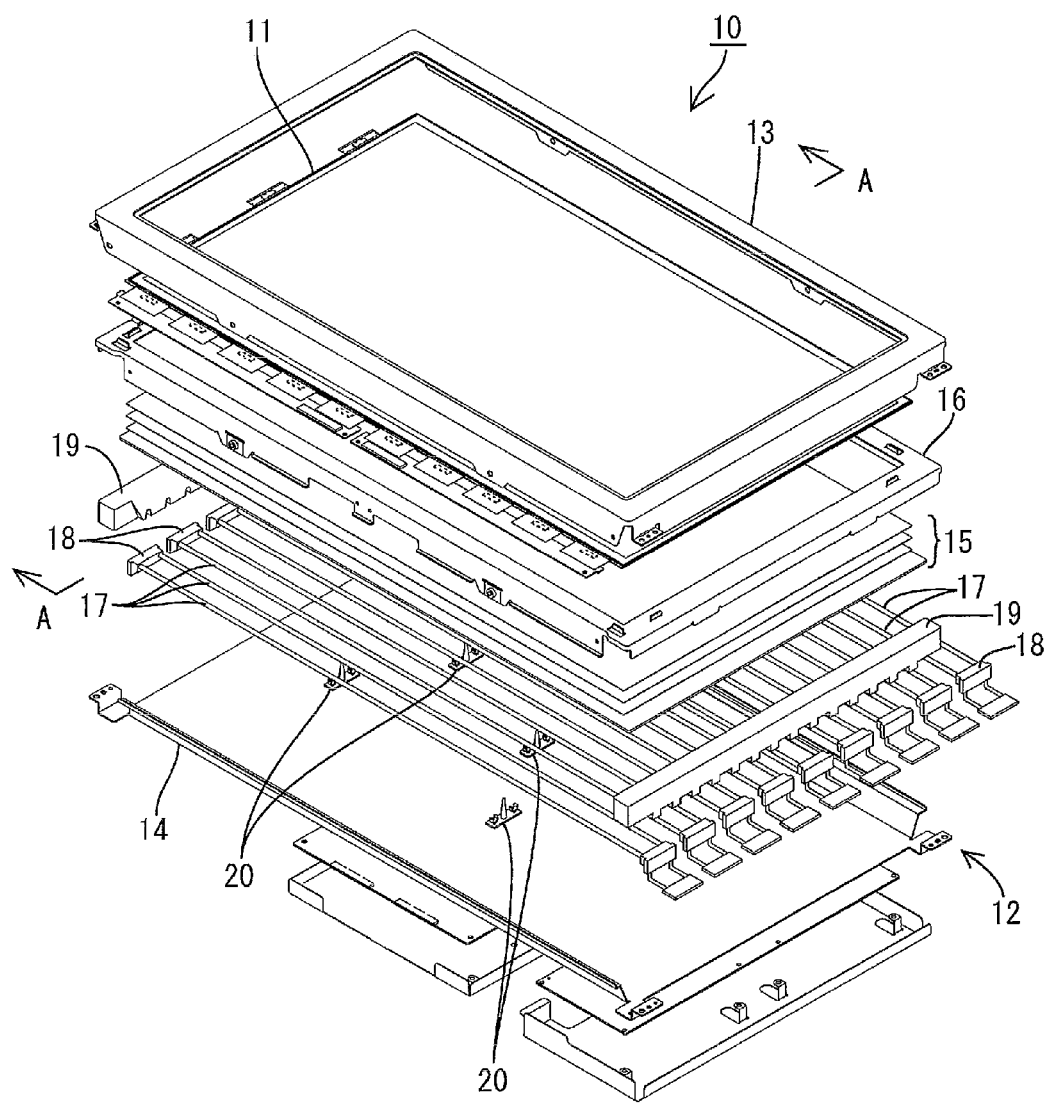
FIG. 1 is a perspective view illustrating a general construction of a liquid crystal display device according to an embodiment of the present invention.
Figure 2:
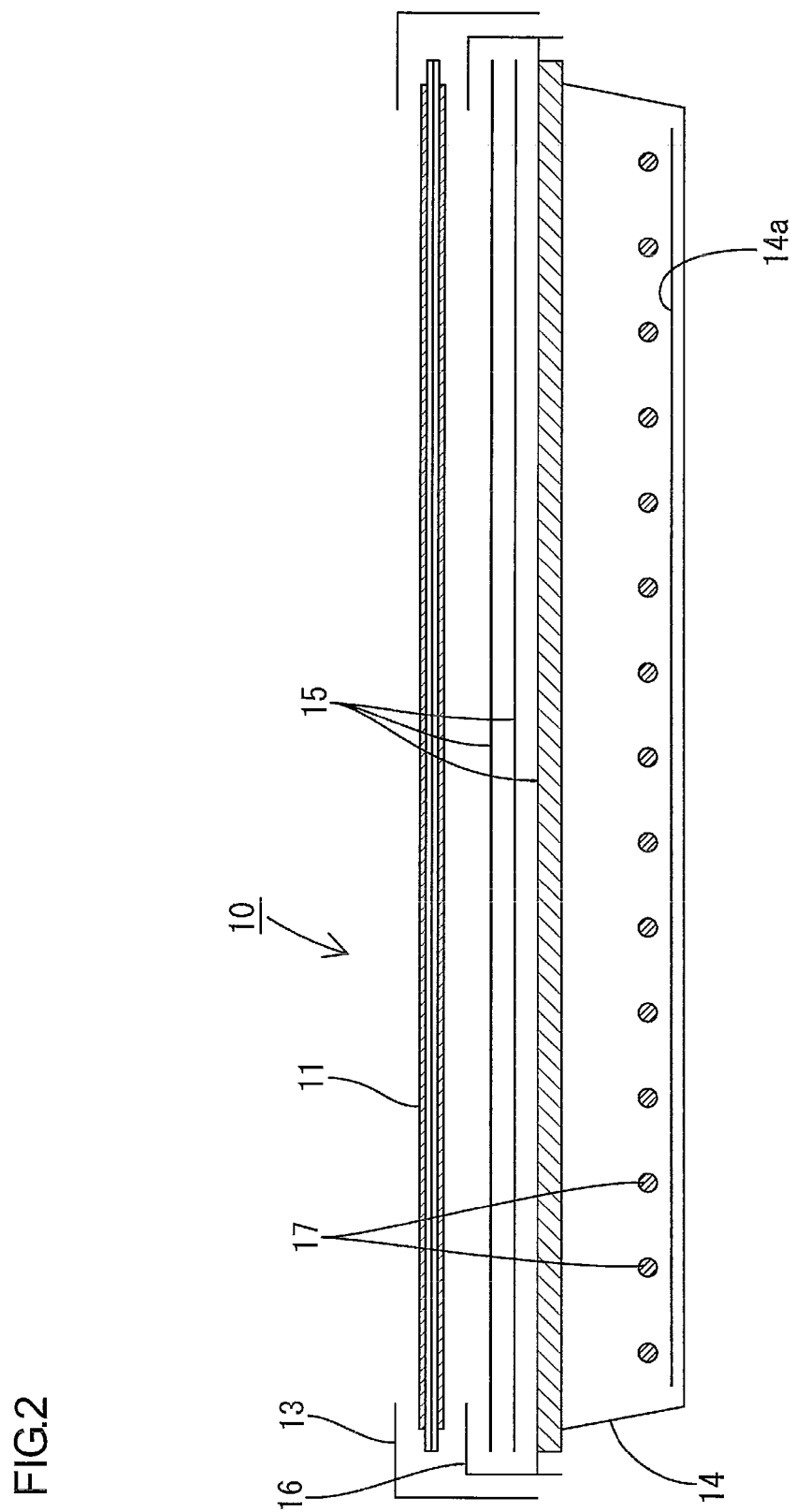
FIG. 2 is a cross-sectional view of the liquid crystal display device illustrated in FIG. 1 along the line A-A.
Figure 3:
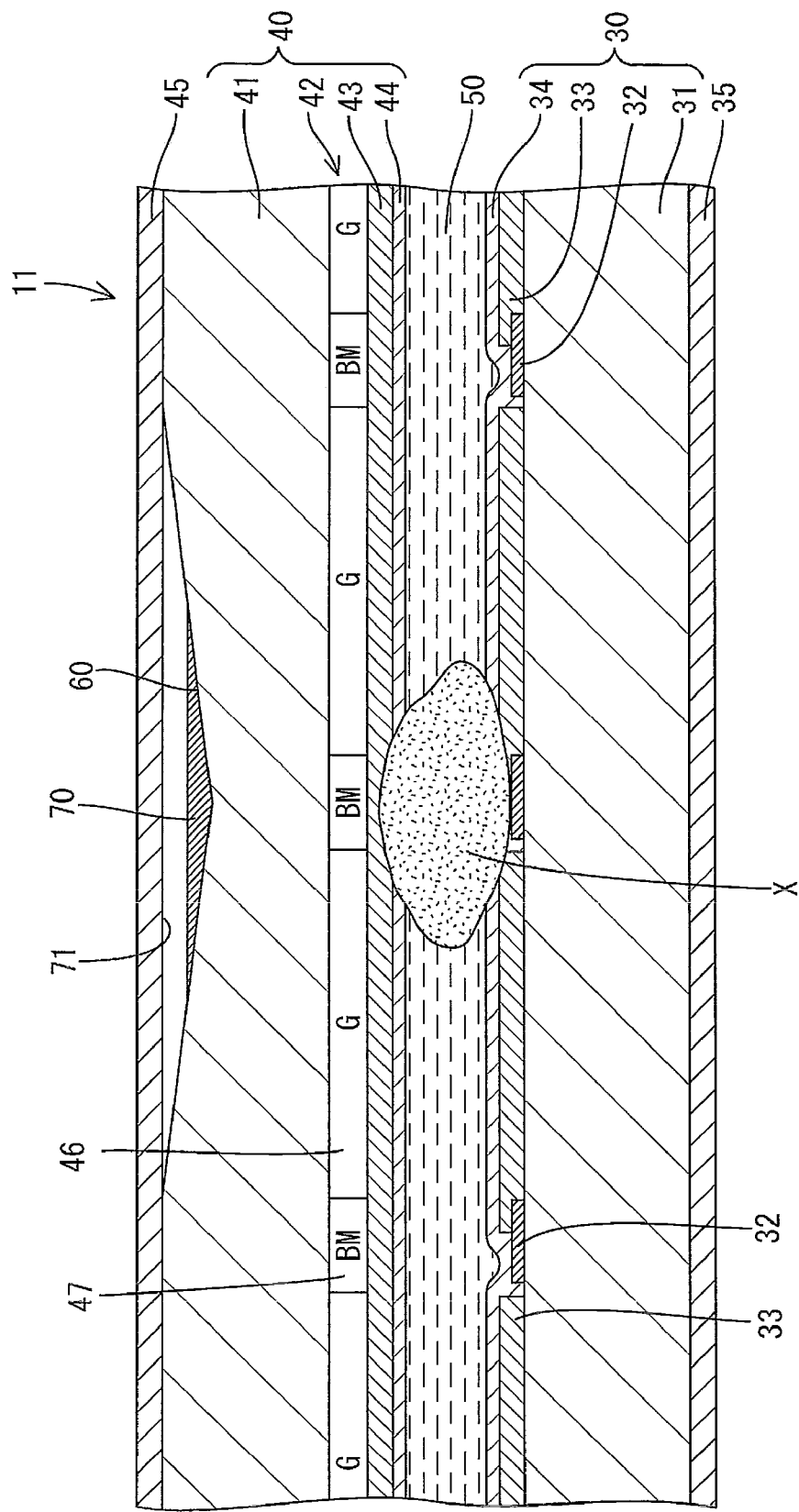
FIG. 3 is a cross-sectional view of a main part of a liquid crystal panel included in the liquid crystal display device illustrated in FIG. 1.
Figure 4:
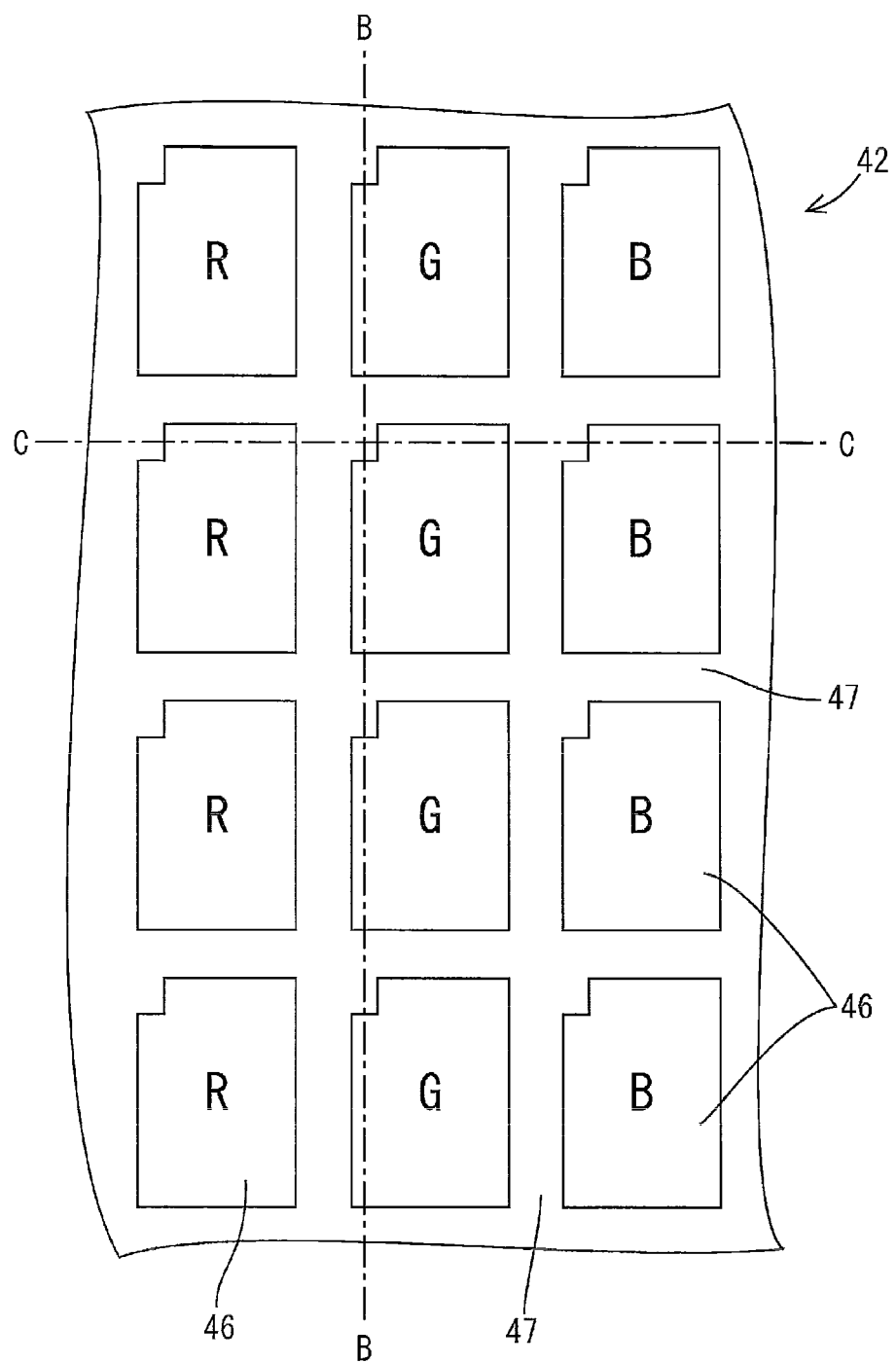
FIG. 4 is a cross-sectional view of a main part of a color filter included in the liquid crystal panel.
Figure 5:
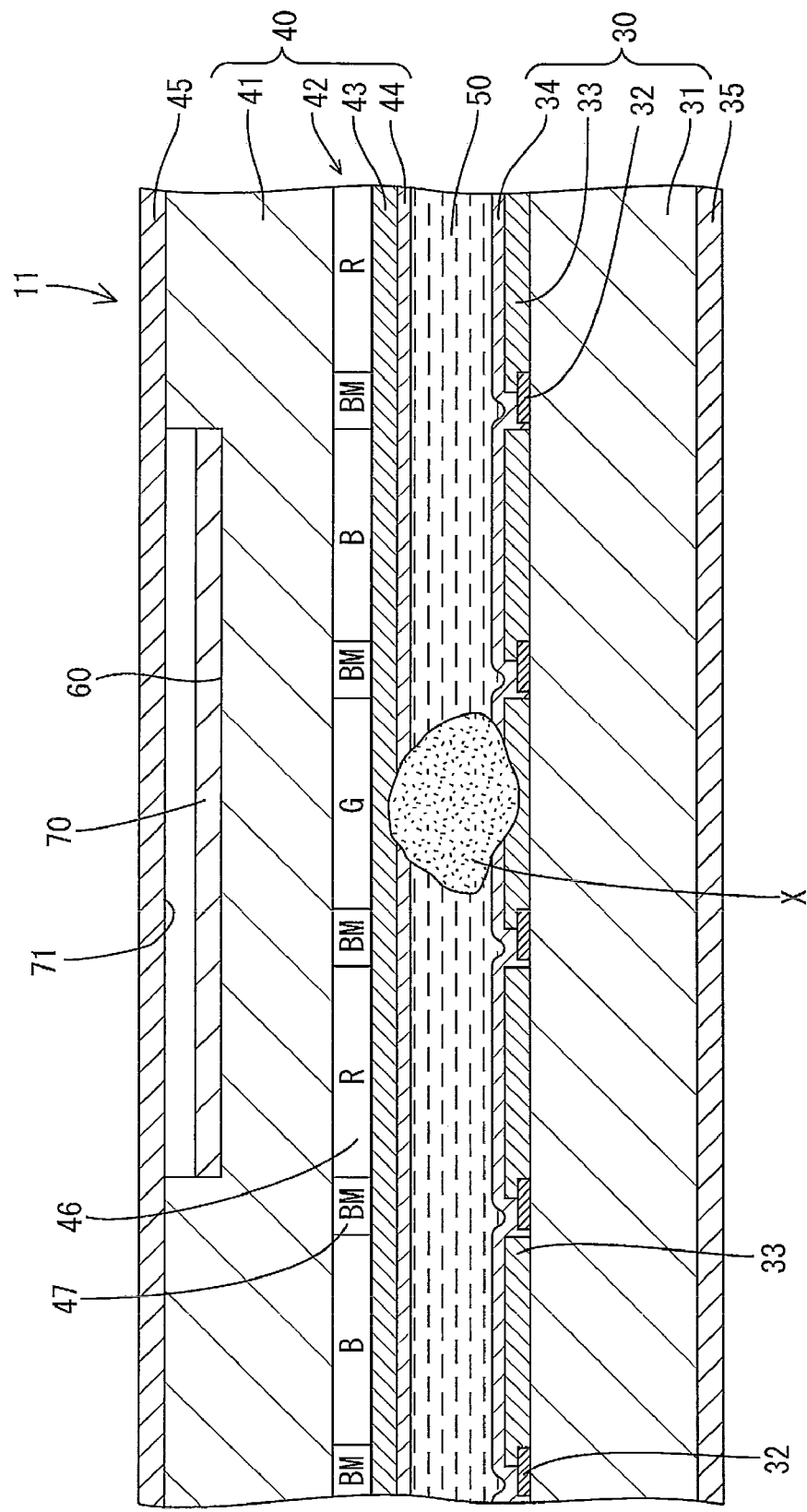
FIG. 5 is another cross-sectional view of the main part of the liquid crystal panel included in the liquid crystal display device illustrated in FIG. 1.
Figure 6:
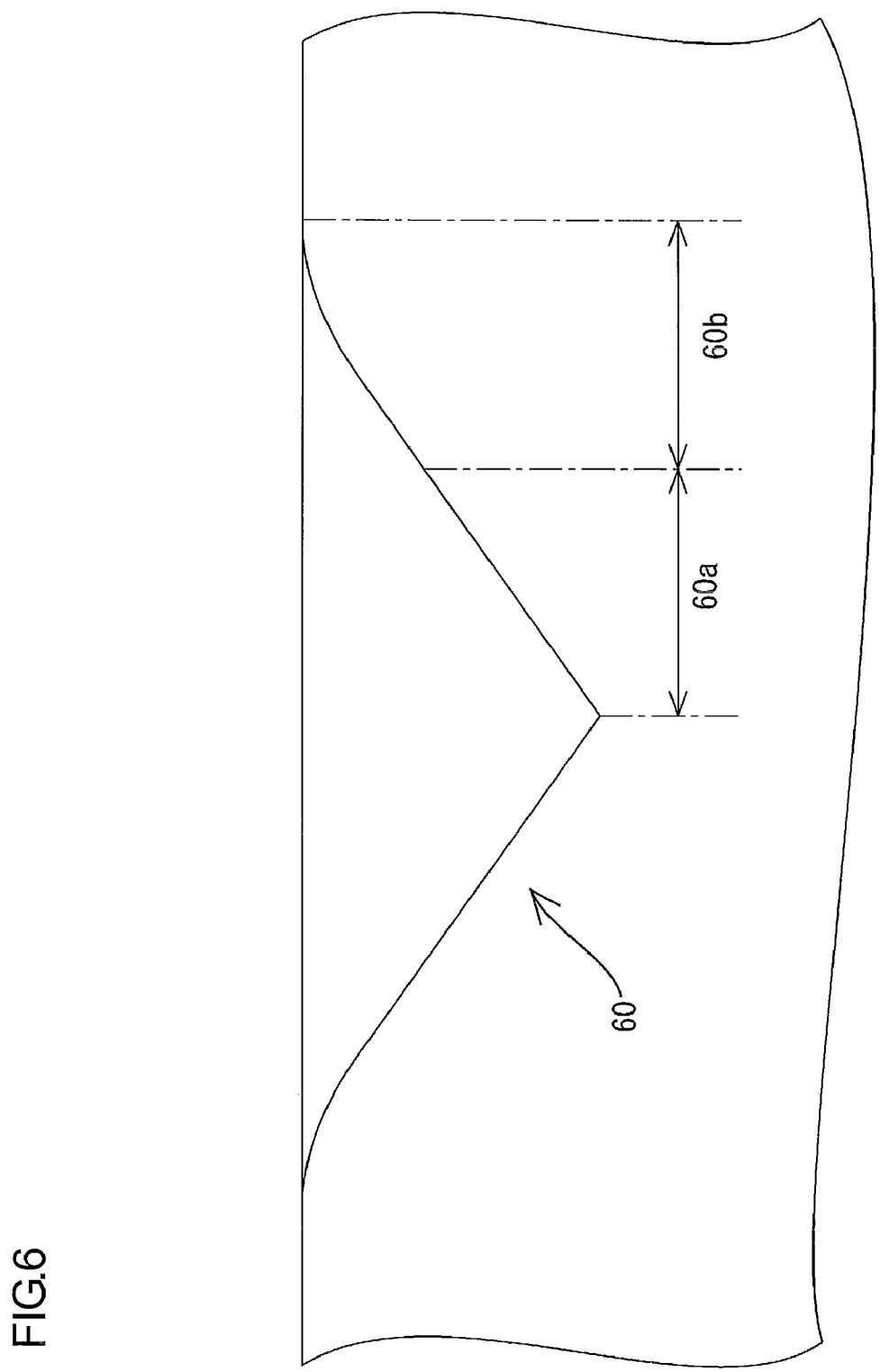
FIG. 6 is a cross-sectional view illustrating a general construction of a concave lens included in the liquid crystal panel.
Figure 7:
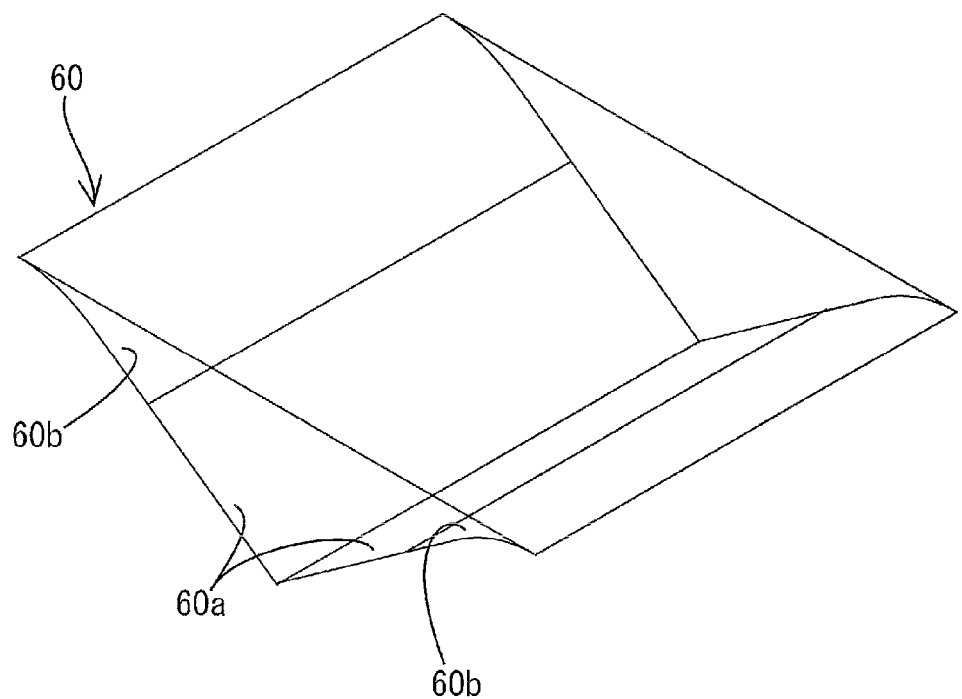
FIG. 7 is a perspective view illustrating the concave lens included in the liquid crystal panel.
Figure 8:
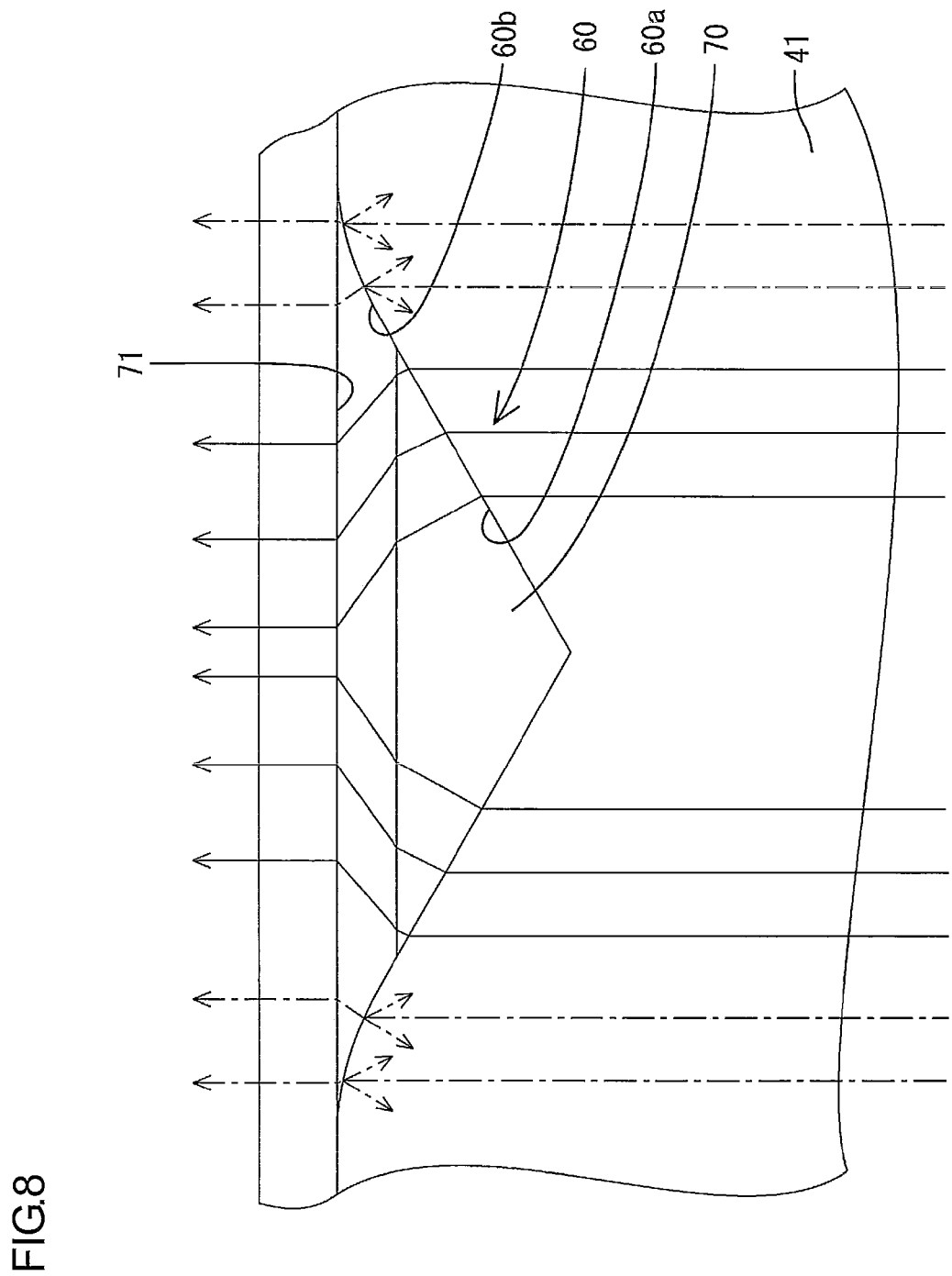
FIG. 8 is an explanatory view describing operational effect of the liquid crystal display device of the embodiment.
Figure 9:
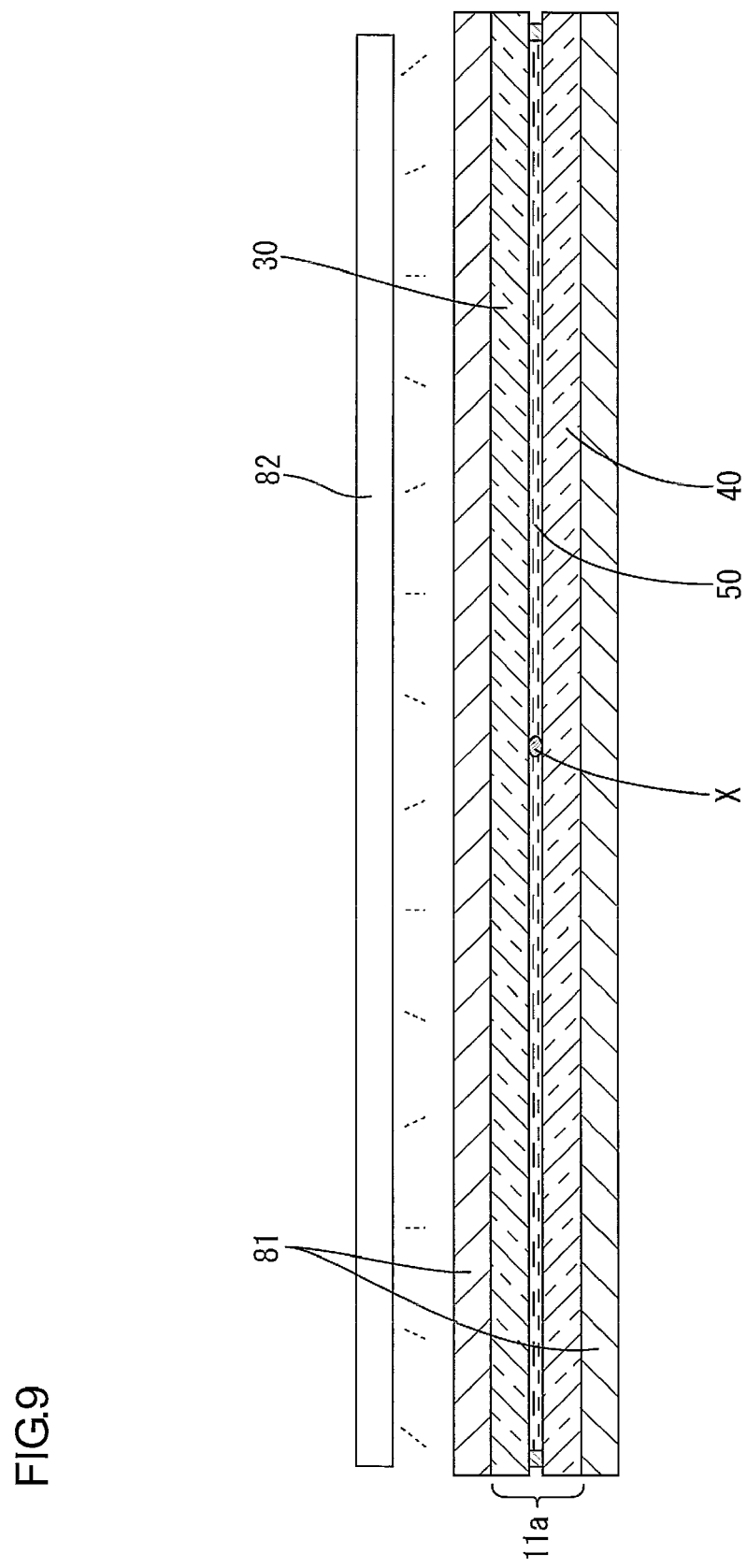
FIG. 9 is an explanatory view describing an illumination inspection process for a liquid crystal panel, which is an inspection object.
Figure 10:
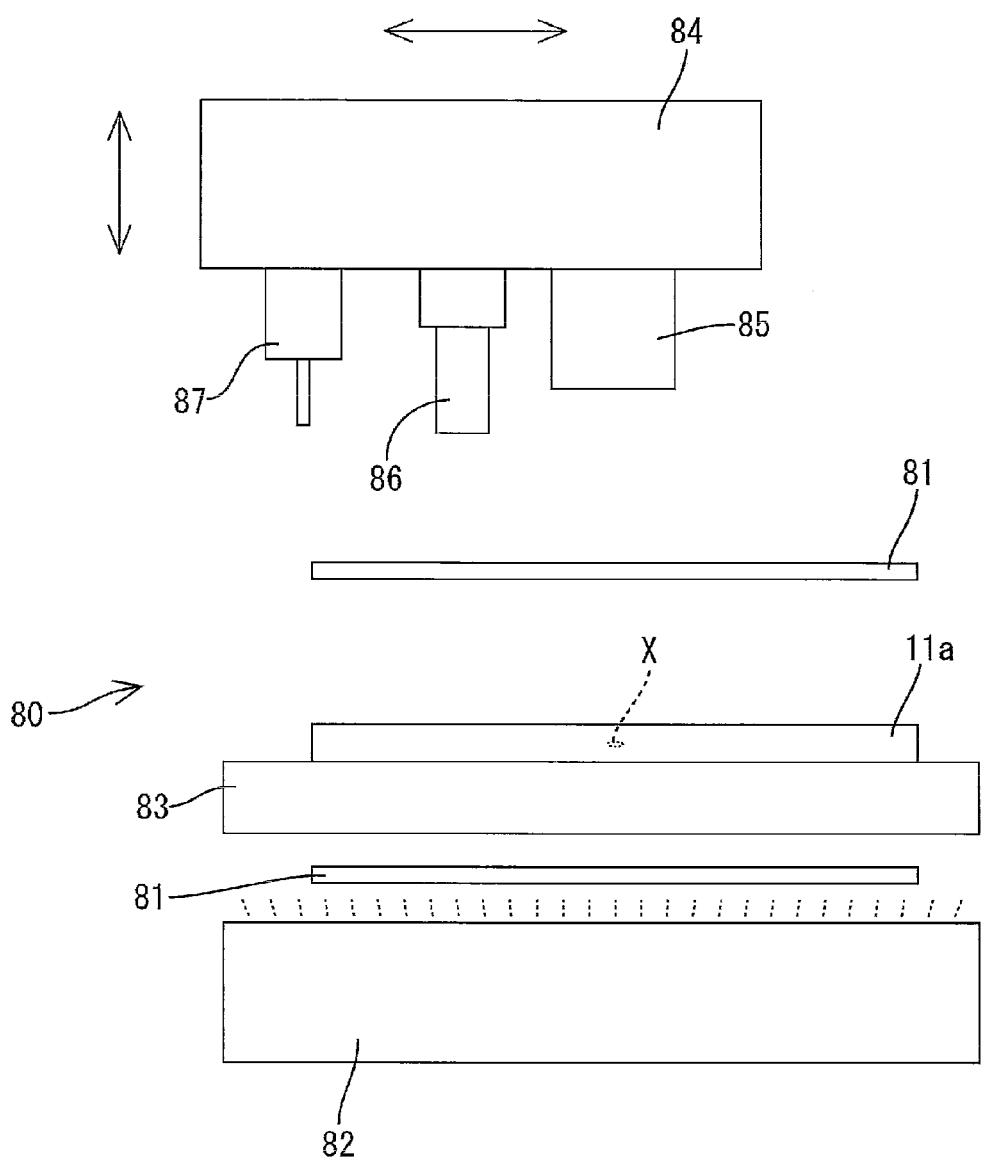
FIG. 10 is a side view illustrating a general construction of a black dot failure compensation device.

FIG. 1 is a perspective view illustrating a general construction of a liquid crystal display device according to an embodiment of the present invention. FIG. 2 is a cross-sectional view of the liquid crystal display device illustrated in FIG. 1 along the line A-A. FIG. 3 is a cross-sectional view of a main part of a liquid crystal panel included in the liquid crystal display device illustrated in FIG. 1. FIG. 4 is a cross-sectional view of a main part of a color filter included in the liquid crystal panel. FIG. 5 is another cross-sectional view of the main part of the liquid crystal panel included in the liquid crystal display device illustrated in FIG. 1. FIG. 6 is a cross-sectional view illustrating a general construction of a concave lens included in the liquid crystal panel. FIG. 7 is a perspective view illustrating the concave lens included in the liquid crystal panel. FIG. 8 is an explanatory view describing operational effect of the liquid crystal display device of the embodiment. FIG. 9 is an explanatory view describing an illumination inspection process for a liquid crystal panel, which is an inspection object. FIG. 10 is a side view illustrating a general construction of a black dot failure compensation device.

An overall construction of a liquid crystal display device 10 according to the present embodiment will be explained. The liquid crystal display device 10, as illustrated in FIGS. 1 and 2, includes a liquid crystal panel 11 having a rectangular shape and a backlight device (lighting device) 12, which is an external light source. The liquid crystal panel 11 and the backlight device 12 are integrally held by a bezel 13 and the like. The backlight device 12 is a so-called direct-light type back light device. It includes a plurality of light sources (cold cathode tubes 17 are used for high-pressure discharge tubes here) arranged directly below a backside of the liquid crystal panel 11, which will be explained later, that is, an opposite side from the panel surface (display surface), and along the panel surface.

The backlight device 12 includes a backlight chassis (chassis) 14, a plurality of optical members 15 and a frame 16. The backlight chassis 14 is formed in a substantially box-shape having an opening on a top. The optical members 15 are arranged so as to cover the opening of the backlight chassis 14. The optical members 15 include a diffuser plate, a diffusing sheet, a lens sheet and a reflection type polarizing plate, arranged in this order from the lower side of the drawings. The frame 16 holds the optical members 15 to the backlight chassis 14. Furthermore, cold cathode tubes 17, resin holders 18, lamp holders 19 and lamp clips 20 are installed in the backlight chassis 14. The resin holders 18 hold ends of the cold cathode tubes 17. The lamp holders 19 collectively cover ends of cold cathode tubes 17 and the holders 18. The lamp clips 20 hold the cold cathode tubes 17 to the backlight chassis 14. A light emitting side of the backlight device 12 is on the optical member 15 side rather than the cold cathode tube 17 side.

Each cold cathode tube 17 has an elongated tubular shape. A plurality of cold cathode tubes 17 (eighteen tubes in FIG. 1) are housed in the backlight chassis 14 such that the longitudinal direction (i.e., axial direction) of each cold cathode tube 17 matches the longitudinal direction of the backlight chassis 14. The lamp clips 20 for mounting the cold cathode tubes 17 to the backlight chassis 14 function as a clip-type holding member for light sources. They are made of synthetic resin (e.g., polycarbonate).

A light reflecting surface is formed on an inner surface (i.e., on a light source side) of the backlight chassis 14 with a light reflecting sheet 14a. The backlight chassis 14 having the light reflecting sheet 14a can reflect light emitted from each cold cathode tube 17 toward the optical members 15, which includes the diffuser plate. A resin sheet having light reflectivity may be used for the light reflecting sheet 14a, for example.

Next, the liquid crystal panel 11 will be explained. The liquid crystal panel 11, as illustrated in FIG. 3, includes a pair of boards 30, 40 bounded with a predetermined gap between them and liquid crystal sealed between those boards 30, 40. The liquid crystal forms a liquid crystal layer 50.

The board 30 is a component board including a glass substrate 31, TFTs (Thin Film Transistor) 32, pixel electrodes 33 and an alignment film 34. The TFTs 32, which are semiconductor components, are formed on a liquid crystal layer 50 side of the glass substrate 31. The pixel electrodes 33 are electrically connected with the TFTs 32. The alignment film 34 is formed on the liquid crystal layer 50 side of the TFTs 32 and pixel electrodes 33. On opposite side of the glass substrate 31 from the liquid crystal layer 50, a polarizing plate 35 is provided. The board 30 (glass substrate 31) is arranged on a backlight device 12 side.

The board 40 is an opposite board including a glass substrate 41, a color filter 42, an counter electrode 43, and alignment film 44. The color filter 42 is formed on the liquid crystal layer 50 side of the glass substrate 41. The counter electrode 43 is formed on the liquid crystal 50 side of the color filter 42. The alignment film 44 is formed on the liquid crystal 50 side of the counter electrode 43. On an opposite side of the glass substrate 41 from the liquid crystal layer 50, a polarizing plate 45 is provided.

The above-described color filter 42 is constructed such that colored portions 46 of R (red), G (green), B (blue) and the like are arranged in a predetermined manner (stripe arrangement in this embodiment), as illustrated in FIG. 4.

As illustrated in FIG. 3, which corresponds a view in a B-B line direction of FIG. 4, the present embodiment further includes means for making a defect that is caused by a foreign substance X in the liquid crystal layer 50 less noticeable. More specifically, a concave lens having a recess on an opposite surface of the glass substrate 41 from the liquid crystal layer 50 is formed. It is formed in an area overlapping an area of the glass substrate 41 in which a shadow of this foreign substance X is projected when viewed in plan.

The foreign substance X lies from the pixel electrode 33 in the board 30 to the counter electrode 43 in the board 40. In this case, a leak occurs between the pixel electrode 33 and the counter electrode 43. Thus, the display corresponding to the area in which the foreign substance X is present is always a black dot display.

A cross-section of the concave lens 60 along a direction in which the colored portions of the color filter 42 in the same color are arranged in a row (i.e., B-B line direction of FIG. 4) is a substantially V-shape. Moreover, it covers two consecutive G colored portions 46 via the black layer 47 between them. A cross-section of the concave lens 60 along a direction in which the colored portions 46 of the color filter 42 in different colors are arranged in a row (i.e., C-C line direction of FIG. 4) is a rectangular. Moreover, it covers three consecutive R, G and B colored portions via the black layers 47 between them. The concave lens 60 has a lens structure having a concave surface only along the direction in which the colored portions 46 in the same color are arranged.

The substantially V-shape lens surface of the concave lens 60 includes central sections 60*a* and hem sections 60*b*. The central sections 60*a* have flat surfaces while the hem sections 60*b* have convex curve surfaces with respect to the lens surface. When light enters the concave lens 60, the central sections 60*a* collect light toward the center of the concave lens by the lens surface while the hem sections 60*b* do not do so.

Epoxy resin 70 capable of light transmission is applied to the surfaces of the concave lens 60 on the liquid crystal layer 50 side. A gap 71 is provided between the epoxy resin 70 and the polarizing plate 45 (See FIGS. 3 and 5). Refraction indexes of the epoxy resin 70, the gap 71 and the glass substrate 41 are 1.60, 1.00 and 1.50, respectively. The refraction index of the epoxy resin 70 is larger than that of the glass substrate 41.

According to the liquid crystal display device 10 of the present embodiment, the concave lens 60 having a recess on an opposite side from the liquid crystal layer 50 is formed in the glass substrate 41. Thus, light that has entered the concave lens 60 after passing through the liquid crystal layer 50 is collected and emitted to the display surface side. The concave lens 60 is formed in the area overlapping the occurrence area in which a black dot caused by the foreign substance X is present when viewed in plan. The light collection effect of the concave lens 60 makes the black dot look microscopic and less noticeable on the display surface.

How to make the black dot look microscopic by the light collection effect will be explained with reference to FIG. 8. In FIG. 8, solid line-arrows and alternate long and short dash line-arrows indicate travel paths of light beams toward an area in which a black dot may be present and toward a normal display area, respectively. The light beams toward the area in which a black dot may be present enter the central section 60*a* having the flat surfaces of the concave lens 60. They are refracted toward the center of the concave lens 60 at the lens surface. The incidence light beams pass through the epoxy resin 70 layer formed on the concave lens 60 and reach a boundary between the epoxy resin 70 and the gap 71. The refraction index of the gap 71 (i.e., air layer) is smaller than that of the epoxy resin 70. Thus, the incidence light beams are further refracted toward the center of the concave lens 60 at the boundary. The refracted light beams are emitted to the display surface via the polarizing plate 45 arranged on the surface of the glass substrate 41.

As described above, the light beams toward the area in which a black dot may be present are collected toward the center of the concave lens 60, and therefore the black dot looks microscopic. As a result, the black dot is less noticeable on the display surface, and a liquid crystal display device having high display quality is provided.

Furthermore, the epoxy resin 70 capable of light transmission and having a larger refraction index than the glass substrate 41 is applied to the surface of the concave lens 60.

This reduces scattering of light due to surface roughness of the concave lens 60. Moreover, the concave lens 60 has a larger refraction index compared to a bare surface of the glass substrate 41. As a result, the concave lens 60 provides higher light collection effect and the black dot on the display surface is less noticeable.

In the present embodiment, the hem sections 60*b* of the concave lens 60 have convex curve surfaces with respect to the lens surfaces.

The light beams toward the normal display area around the black dot enter the hem sections 60*b* of the concave lens 60, as indicated with the alternate long and short dash line-arrows in FIG. 8. Because the hem sections 60*b* have convex curve surfaces with respect to the lens surface, incidence light beams toward the normal display area are not refracted toward the center. This restricts the light beams toward the normal display area from being drawn into a concave lens 60 and therefore only the black dot becomes less noticeable.

In the present embodiment, the concave lens 60 has concave surfaces along directions in which the color portions 46 of the same color, which are included in the color filter 42, are arranged.

The concave lens 60 provides light collecting effect in the direction in which the color portions 46 in the same color are arranged while it does not in the direction in which the color portions 46 in the different colors are arranged. This restricts different colors from being mixed and displayed.

In the present embodiment, the epoxy resin 70 is used as a light transmissive material.

The epoxy resin 70 has good adhesiveness and chemical stability. It also has a refraction index of 1.55 or higher, which is relatively high as a light transmissive material. Therefore, it is a preferable light transmissive material to be applied on the concave lens 60.

Next, the method of manufacturing the liquid crystal display device 10 will be explained.

A manufacturing process that includes a compensation process will be mainly explained here.

First, the glass substrate 31 is prepared, and the TFTs 32 and the pixel electrodes 33 are formed on the glass substrate 31. Next, the alignment film 34 is formed on the TFTs 32 and the pixel electrodes 33 to produce the board 30, which is a component board.

Meanwhile, the glass substrate 41, which is another glass substrate, other than the above-described glass substrate 31, is prepared. The color filter 42 is formed on the glass substrate 41, and the counter electrode 43 is formed on the color filter 42. Furthermore, the alignment film 44 is formed on the counter electrode 43 to produce the board 40, which is an opposite board.

The color filter 42 is formed by arranging the colored portions 46 of R (red), G (green), B (blue) and the like in a predetermined sequence via the black layers 47 between them, as illustrated in FIG. 4.

The boards 30 and 40 are bonded with a predetermined gap between them. Liquid crystal is sealed in the gap to form the liquid crystal layer 50. Moreover, the polarizing plates 35 and 45 are arranged on the opposite sides of the boards 30 and 40 from the liquid crystal layer 50, respectively, to produce the liquid crystal panel 11 (See FIG. 3). In an assembly process of the liquid crystal panel 11 and the backlight device 12, which will be explained later, the board 30 (glass substrate 31) among those boards 30 and 40 is arranged on the backlight device 12 side.

In the above-described manufacturing process, an illumination inspection for detecting display defects is performed after the liquid crystal layer 50 is formed. The liquid crystal panel in the manufacturing process is referred to as a test liquid crystal panel 11a hereinafter.

More specifically, a pair of polarizing plates 81 for inspection is arranged so as to sandwich the boards 30, 40 of the test liquid crystal panel 11a, as illustrated in FIG. 9. A backlight 82 for inspection is turned on. Electrical lines formed on the glass substrate 31 are connected to a test circuit and appropriate electrical signals are fed to respective lines to drive the TFTs 32. Display conditions produced by controlling alignment of the liquid crystal that forms the liquid crystal layer 50 are inspected through image processing or visually by an inspector.

In the inspection, a black dot, that is, a dot always displayed in black, may be viewed during color display and may be detected as a black dot defect. The black dot defect may result from a foreign substance X lying from the pixel electrode 33 in the board 30 to the counter electrode 43 in the board 40 in the liquid crystal layer 50. When such a black dot defect (hereinafter referred to as a black dot failure as well) is detected, a black dot failure compensation process, which will be explained next, will be performed for compensating for the black dot failure.

Possible causes of the foreign substance X entering the liquid crystal layer 50 include that the foreign substance X has adhered to a surface of the board 30 or 40 on the liquid crystal layer 50 side before injecting the liquid crystal, and that it has been entered in the liquid crystal.

The black dot failure compensation process includes specifying a black dot failure display area in which a black dot failure is displayed on the glass substrate 41, forming a concave lens 60 by applying a laser beam with a femtosecond order or shorter pulse width to the specified black dot failure display area on the glass substrate 41, and applying a light transmissive material the epoxy resin 70 having a refraction index equal to or higher than the glass substrate 41 to at least a part of the concave lens 60.

In the black dot failure compensation process, a black dot failure compensation device 80 illustrated in FIG. 10 is used for compensating for a black dot failure. The black dot failure compensation device 80 has a stage 83 (not illustrated in FIG. 9), a pair of polarizing plates 81 for inspection, a backlight 82 for inspection and an XYZ driving section 84. The stage 83 is provided for setting on the test liquid crystal panel 11a, which is a compensation object. The polarizing plates 81 are arranged so as to sandwich the stage 83. The XYZ driving section 84 moves in horizontal and vertical directions of the stage 83. The XYZ driving section 84 has a CCD camera 85, a laser emitting section 86 and a dispenser 87 arranged in predetermined relative positions. The CCD camera 85 is provided for capturing the foreign substance X and its surrounding area. The laser emitting section 86 outputs a laser beam for forming the concave lens 60. The dispenser 87 is provided for applying the epoxy resin 70 to the surface of the concave lens 60. The stage 73 is made of glass so as to transmit light emitted from the backlight 82.

With the black dot failure compensation device 80, a black dot failure display area on the glass substrate 41 is specified. First, the test liquid crystal panel 11a, which may be a compensation object, is set on the stage 83 in the predetermined position. It should be set such that the glass substrate 41 is on the top. Next, the backlight 82 for inspection is turned on to put the test liquid crystal panel 11a in a black display state. The XYZ driving section 84 is moved in the horizontal direction of the stage 83 to capture display conditions by the CCD camera 85. The captured display conditions are processed through image processing to provide information on display location and size of the black dot failure.

Next, forming the concave lens in the specified display area will be performed. In this operation, the concave lens 60 is formed by applying a beam of femtosecond laser with a $10^{-13}$ second-order pulse width to the glass substrate 41. More specifically, the XYZ driving section 84 is moved so that the laser emitting section 86 is positioned directly above the specified black dot failure display area. In the present embodiment, the laser beam is applied in the following condition: 780 nm wavelength, 100 fs pulse width, 1 kHz repeating frequency, 1mJ pulse energy and 1 W output.

At the laser focus on the glass substrate 41, a glass structure is locally melted and thus a preferable fine process can be performed there. By moving the laser beam focus continuously within the glass substrate 41, the concave lens 60 is formed as a continuous area along a trace of laser beam focuses (See FIG. 3). In the present embodiment, an acid treatment using hydrofluoric acid is performed on the surface of the concave lens 60 after the concave lens 60 is formed.

The concave lens 60 is formed in a substantially V-shape covering two consecutive G colored portions 46 with the black layer 47 between them in a direction that the colored portions 46 in the same color of the color filter 42 are arranged (B-B line direction of FIG. 4), as illustrated in FIG. 3. In a direction that the colored portions 46 in the different colors of the color filter 42 are arranged (C-C line direction in FIG. 4), the concave lens is formed in a rectangular shape covering three consecutive color sections 46, that is R, G and B color sections, with the black layers 47 between them. Namely, the concave lens 60 is formed in a lens shape having a concave surface only along the direction that the colored portions 46 in the same color are arranged.

In forming the substantially V-shaped lens surface of the concave lens 60, the central sections 60a in a flat shape and the hem sections 60b having a convex curve surface with respect to the lens surface are formed, as illustrated in FIGS. 6 and 7. When light beams enter the lens 60, they are collected toward the center of the concave lens 60 at the lens surface in the central sections 60a of the concave lens 60. On the other hand, they are not collected in the hem sections 60b.

Next, the light transmissive material application that applies the epoxy resin 70, which is a light transmissive material, to the surface of the above-described concave lens 60 will be performed. More specifically, the XYZ driving section 84 is moved so that the dispenser 87 is positioned directly above the concave lens 60, which is formed in the above-described operation, and the epoxy resin 70 is applied. The epoxy resin 70 applied in this operation has a higher refraction index compared to the glass substrate 41. In the present embodiment, the epoxy resin 70 is applied to a part of the surface of the concave lens 60. Moreover, a gap 71 is formed between the applied epoxy resin 70 and the polarizing plate 45 arranged on the surface of the glass substrate 41 after this operation.

A driver (not illustrated) that is manufactured in a different process and the backlight device 12 are assembled to the liquid crystal panel 11 in which the compensation for the black dot failure is performed in the above process to produce the liquid crystal display device 10.

According to the method of manufacturing the liquid crystal device 10 including the above compensation process of the present embodiment, the liquid crystal display device 10 in which a concave lens 60 is formed in an area that overlaps a black dot failure display area on the glass substrate 41 is provided. The concave lens 60 has a recess on an opposite side from the liquid crystal layer 50. With such a liquid crystal display device 10, light beams that enter the concave lens 60 are collected when passing through the concave lens 60. Thus, the black dot failure converges to its center and looks microscopic. As a result, the black dot failure is less noticeable on the display surface, and a high display quality is achieved.

Furthermore, the concave lens 60 is formed by applying femtosecond laser in the present embodiment.

By applying femtosecond laser having high energy peak to the glass substrate 14, a local melting occurs by thermal accumulation and diffusion of energy created by photon oscillation in the glass structure. As a result, a preferable fine process of the glass substrate 41 can be performed. Moreover, by using the femtosecond-order laser, energy is absorbed by the laser application area faster than conduction of heat created by the laser to a surrounding area of the laser application area. Thus, the liquid crystal layer 50 is not thermally damaged by heat of the laser conducted through the glass substrate 41.

In the present embodiment, the epoxy resin 70 is applied to a part of the surface of the concave lens 60 as a light transmissive material having a refraction index equal to or higher than the glass substrate 40.

This reduces scattering of light due to surface roughness of the concave lens 60 created by laser processing and form the concave lens 60 having a higher refraction index compared to the bare surface of the glass substrate 41.

The epoxy resin 70 has high chemical stability and a relatively high refraction index, which is 1.55 or higher. Therefore, it is a preferable light transmissive material for applying to the concave lens.

In the present embodiment, an acid treatment using hydrofluoric acid is performed on the surface of the concave lens 60 after the concave lens 60 is formed.

This smoothes the surface of the concave lens 60 and reduces scattering of incident light. Thus, the concave lens 60 having higher light collectivity can be formed.

<Other Embodiment>

The present invention is not limited to the embodiment explained in the above description made with reference to the drawings. The following embodiments may be included in the technical scope of the present invention, for example.

(1) In the above embodiment, the concave lens 60 is formed as means for making a black dot defect resulting from a leak between the board 30 and 40 look microscopic. However, the present invention can be applied for the following display defects.

Figure 11:
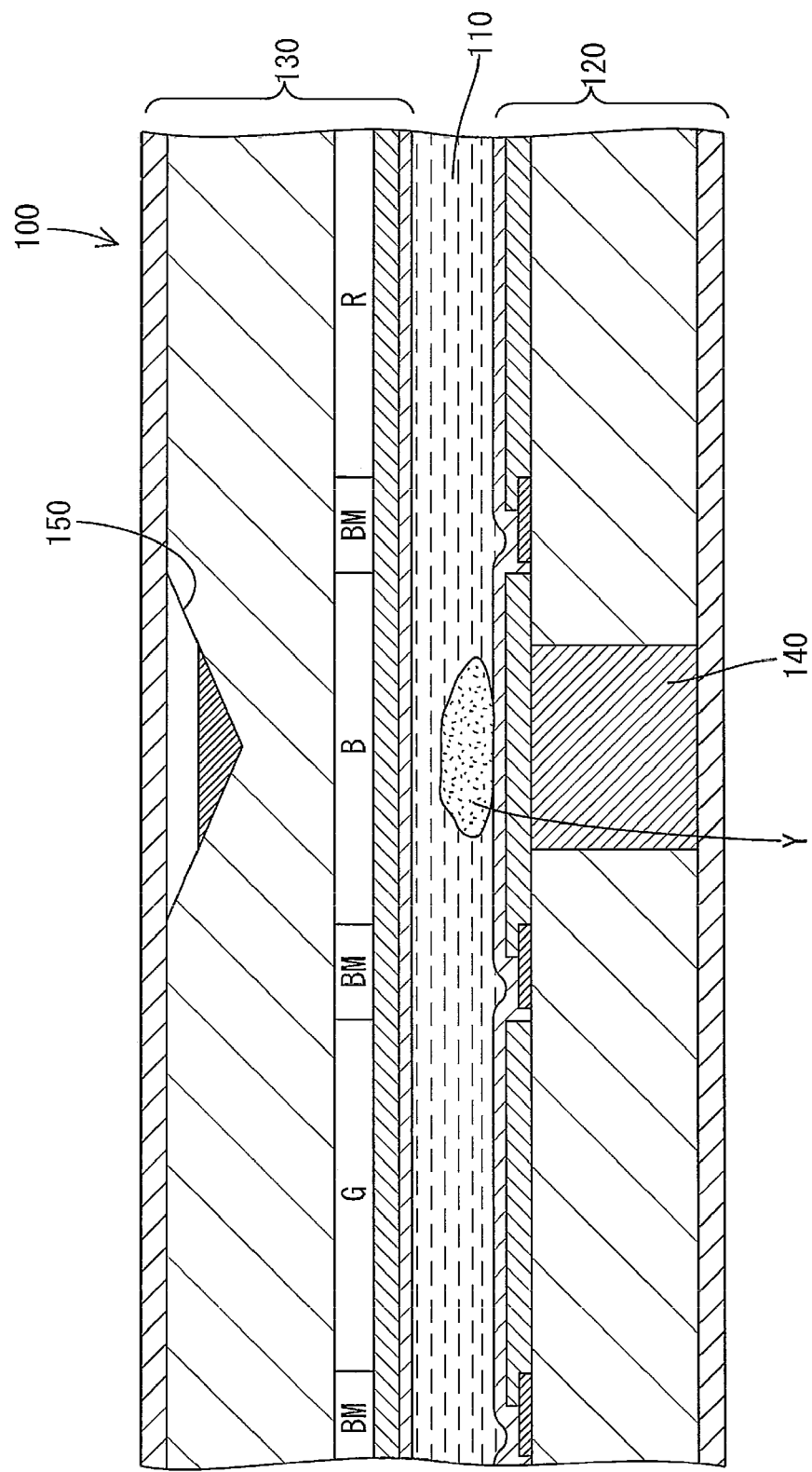
FIG. 11 is a cross-sectional view illustrating a general construction of a main part of a modification of the liquid crystal display device.

If a foreign substance Y is present in the liquid crystal layer 110 of the liquid crystal panel 100 as illustrated in FIG. 11, a luminance point defect may occur due to irregular reflection of light off the foreign substance Y. For the luminance point defect, a light blocking layer 140 is formed in a board 120, for example, to blacken the luminance point defect and make it a black dot that is a display failure less noticeable. By forming a concave lens 150 in the area in which a black dot failure caused by blackening of the luminance point defect in a board 130, the black dot failure becomes less noticeable.

The luminance point defect may occur due to a malfunction of TFTs or pixel electrodes caused by a short circuit and the like. The present invention can apply for such a defect.

(2) In the above embodiment, the gap 71 is formed between the epoxy resin 70 applied to the concave lens 60 and the polarizing plate 45. However, the epoxy resin 70 may be filled in the concave lens 60. In this case, forming the gap 71 is preferable to obtain a definite effect in making a black dot failure look microscopic.

(3) In the above embodiment, the epoxy resin 70 is used as a light transmissive material for applying to the concave lens 60. However, a material applied to the concave lens 60 is not limited to the epoxy resin as long as the material has a higher refraction index than that of the glass substrate 41 and capable of light transmission.

Figure 12:
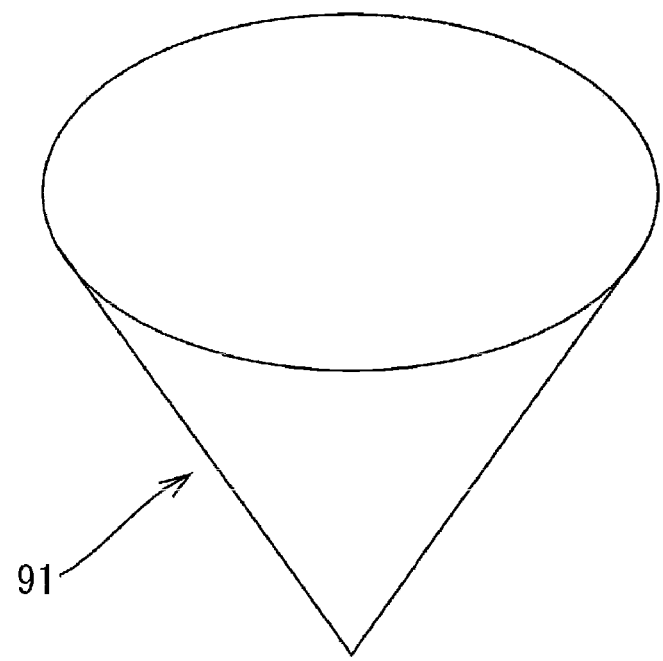
FIG. 12 is a perspective view of a modification of the concave lens.
Figure 13:
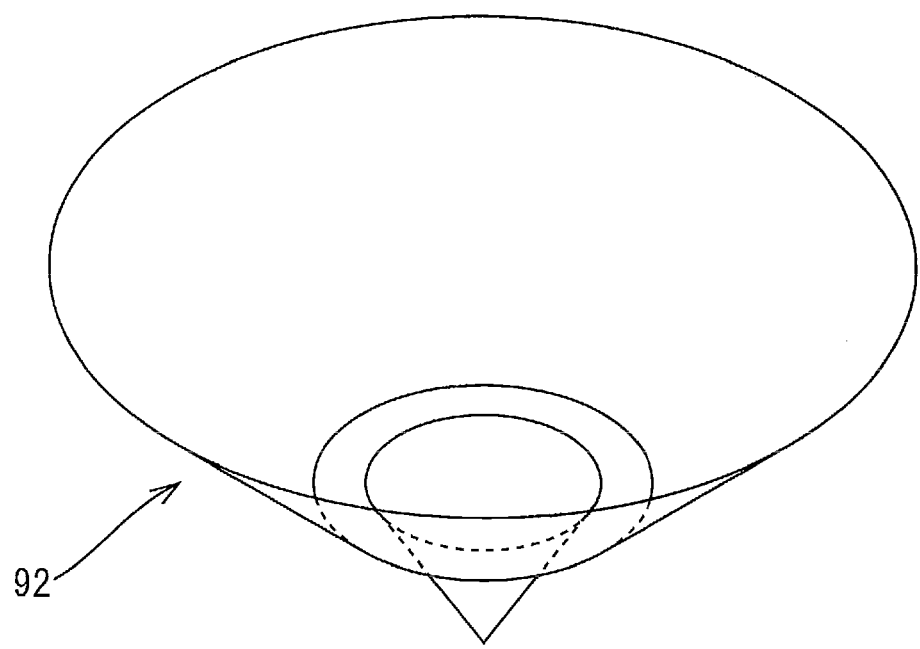
FIG. 13 is a perspective view of a modification of the concave lens.
Figure 14:
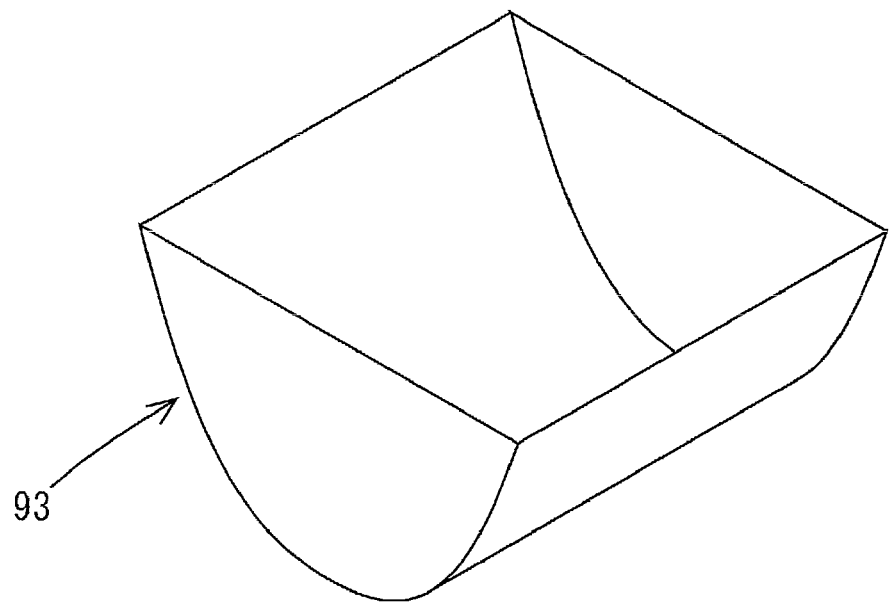
FIG. 14 is a perspective view of a modification of the concave lens.

(4) In the above embodiment, the concave lens 60 is formed in a substantially triangular pyramid shape. However, it may be a cone-shaped concave lens as illustrated in FIG. 12, a two-step cone-shaped concave lens 92 as illustrated in FIG. 13, a substantially semi-cylindrical shaped concave lens 93 as illustrated in FIG. 14 and the like.

(5) In the above embodiment, the femtosecond laser with a 100 fs pulse width is applied for forming the concave lens 60. In a view of reducing damages to a surrounding area of the laser focus, the pulse width is smaller the better. Thus, laser with a smaller pulse width within an acceptable range for compensation efficiency can be used.

(6) In the above embodiment, the wavelength of laser used to form the concave lens 60 is 780 nm. However, the wavelength of laser is not specially specified. An ultraviolet wavelength (e.g., 260 nm) or other preferable wavelength can be selected. Moreover, other conditions of laser application may be changed based on composition of the glass substrate to which the laser is applied.

(7) In the above embodiment, specifying the black dot failure display area, forming the concave lens 60 by applying laser, and applying the epoxy resin (light transmissive material) 70 to the surface of the concave lens 60 are performed by the black dot failure compensation device 80. However, separate devices may be used for performing those operations to make a structure of each device simple.

(8) In the black dot failure compensation device 80 of the above embodiment, the XYZ driving section 84, which includes the DDC camera 85, the laser emitting section 86 and the dispenser 87, moves in the horizontal or vertical direction of the stage 83. However, the black dot failure compensation device 80 can have configurations such that a stage moves in the horizontal or vertical direction of a CCD camera, a laser emitting section, and a dispenser that are fixed.

(9) The present invention can be also applied to a liquid crystal display device using switching elements other than TFTs 32.

The invention claimed is:

1. A liquid crystal display device, comprising:
    a liquid crystal panel having a liquid crystal layer between a pair of glass substrates; and
    a lighting device that provides illumination light to said liquid crystal panel, wherein:
    one of said pair of glass substrates arranged on an opposite side from said lighting device has a concave lens with a recess on a surface of said glass substrate located on an opposite side from said liquid crystal layer in an area that overlaps a black dot failure occurrence area when viewed in plan, said concave lens having a hem section with a convex curve surface; and
    said concave lens has a light transmissive material applied at least in a part thereof, said light transmissive material having a refraction index equal to or higher than said glass substrate.

2. A liquid crystal display device as in claim 1, wherein said light transmissive material is epoxy resin.

3. A liquid crystal display device, comprising:
a liquid crystal panel having a liquid crystal layer between a pair of glass substrates; and
a lighting device that provides illumination light to said liquid crystal panel, wherein:
one of said pair of glass substrates arranged on an opposite side from said lighting device has a concave lens with a recess on a surface of said glass substrate located on an opposite side from said liquid crystal layer in an area that overlaps a black dot failure occurrence area when viewed in plan, and having a color filter in which a plurality of colored portions are arranged in a regular manner; and
said concave lens has a concave surface along a direction in which said colored portions in same color are arranged and a light transmissive material applied at least in a part thereof, said light transmissive material having a refraction index equal to or higher than said glass substrate.

4. A liquid crystal display device as in claim 3, wherein said light transmissive material is epoxy resin.

5. A method of manufacturing a liquid crystal display device having a liquid crystal panel in which a liquid crystal layer is formed between a pair of glass substrates and a lighting device that provides illumination light to said liquid crystal panel, comprising a black dot failure compensation process for compensating for a black dot failure if such a black dot failure is present, said black dot failure compensation process including:
specifying a black dot display area on a glass substrate of said pair of glass substrates that is arranged on an opposite side from said lighting device;
forming a concave lens having a recess on a surface of said glass substrate, said surface located on an opposite side from the liquid crystal laver, by applying laser with a femtosecond-order or shorter pulse width to said black dot failure display area that is specified on said glass substrate, and by forming a hem section with a convex curve surface; and
applying a light transmissive material having a refraction index equal to or higher than said glass substrate to at least a part of said concave lens.

6. A method of manufacturing a liquid crystal display device as in claim 5, wherein said forming a concave lens includes an acid treatment performed on a surface of said concave lens after said concave lens is formed.

7. A method of manufacturing a liquid crystal display device as in claim 5, wherein said applying light transmissive material applies epoxy resin as said light transmissive material.

8. A method of manufacturing a liquid crystal display device having a liquid crystal panel in which a liquid crystal layer is formed between a pair of glass substrates and a lighting device that provides illumination light to said liquid crystal panel, comprising a black dot failure compensation process for compensating for a black dot failure if such a black dot failure is present, said black dot failure compensation process including:
specifying a black dot display area on a glass substrate of said pair of glass substrates that is arranged on an opposite side from said lighting device;
forming a concave lens having a recess on a surface of said glass substrate, said surface located on an opposite side from the liquid crystal layer, by applying laser with a femtosecond-order or shorter pulse width to said black dot failure display area that is specified on said glass substrate;
applying a light transmissive material having a refraction index equal to or higher than said glass substrate to at least a part of said concave lens; and
forming a color filter in which a plurality of colored portions are arranged in one of said pair of glass substrates in a regular manner,
wherein said forming a concave lens is characterized by forming a concave lens having a concave surface along a direction in which said colored portions in the same color are arranged.

9. A method of manufacturing a liquid crystal display device as in claim 8, wherein said forming a concave lens includes an acid treatment performed on a surface of said concave lens after said concave lens is formed.

10. A method of manufacturing a liquid crystal display device as in claim 8, wherein said applying light transmissive material applies epoxy resin as said light transmissive material.

* * * * *